Dec. 27, 1927.

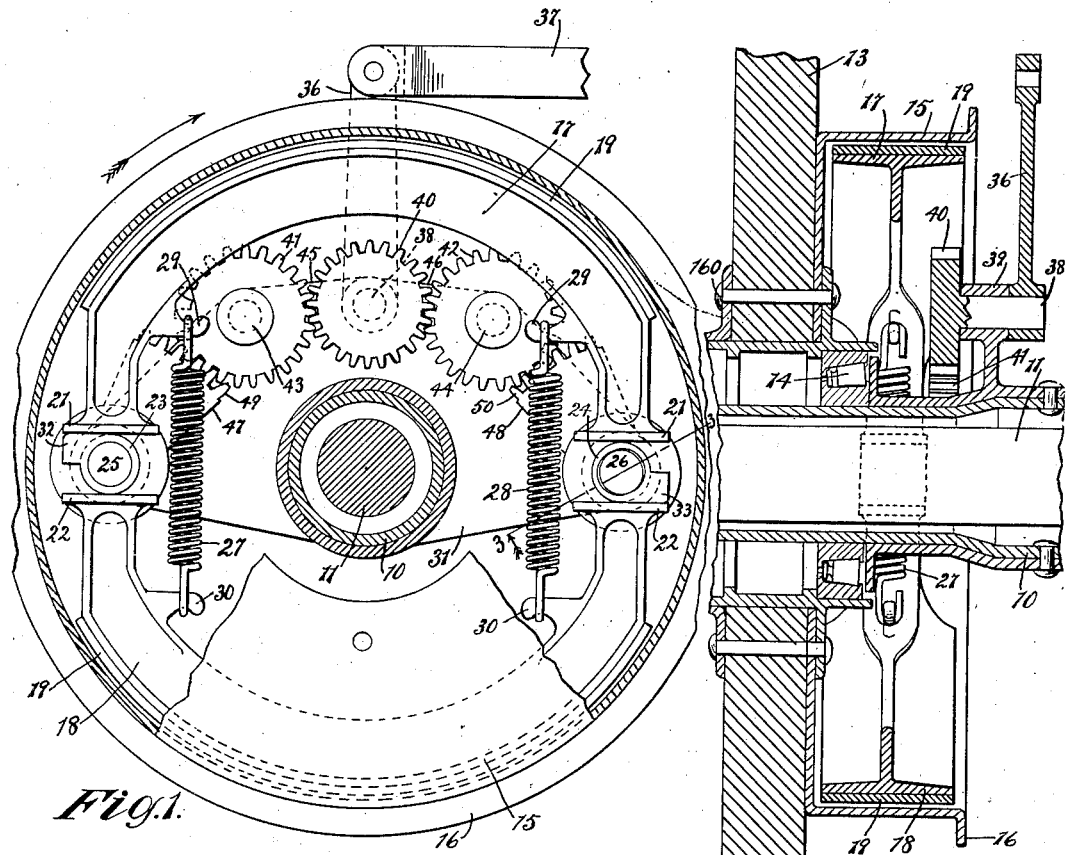

S. DEE 1,653,948

BRAKE

Filed Jan. 7, 1924  2 Sheets-Sheet 2

Inventor:
Simon Dee
By
Att'ys

Patented Dec. 27, 1927.

1,653,948

UNITED STATES PATENT OFFICE.

SIMON DEE, OF CHICAGO, ILLINOIS.

BRAKE.

Application filed January 7, 1924. Serial No. 684,787.

This invention relates to brakes, and more particularly to brakes for motor vehicles. One of the objects of the invention is the provision of a new and improved arrangement of braking mechanism whereby the maximum braking effect may be accomplished with the minimum amount of force for applying the same.

Another object of the invention is the provision of new and improved braking mechanism that is so constructed that the frictional engagement of the brake shoes with the rotating brake drum will tend to assist in further applying the brakes.

A still further object of the invention is the provision of new and improved mechanism that is simple in construction, cheap to manufacture, easily assembled, efficient in operation and one that is not likely to become broken or get out of order.

Other and further objects and advantages of the invention will appear from the following description taken in connection with the accompanying drawings, in which Fig. 1 is a side elevation of the brake drum with the brake mechanism in position therein, the axle and housing being shown in section, and with parts broken away to more clearly illustrate the mechanism;

Fig. 2 is a vertical section of the wheel and axle, showing the brake mechanism in position thereon, with parts broken away;

Fig. 3 is a section on line 3—3 of Fig. 1, with parts broken away;

Fig. 4 is a section on line 4—4 of Fig. 3;

Figures 5, 6:
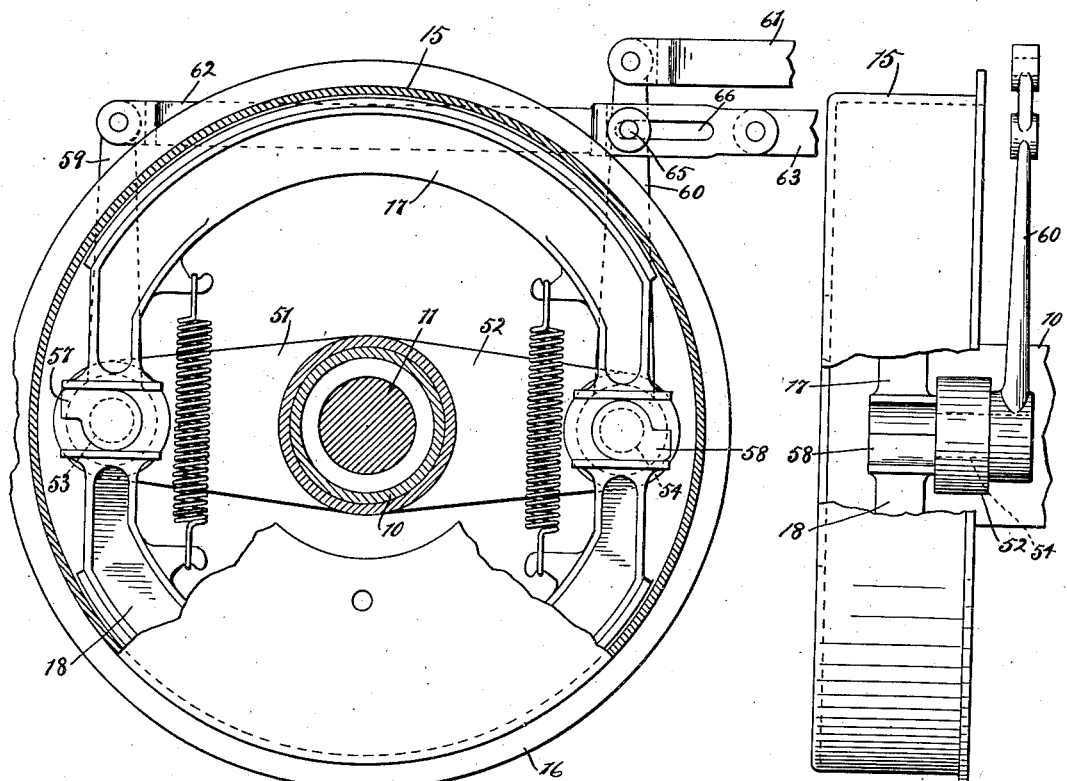
Fig. 5 is a view similar to Fig. 1, but showing a modified form of the device.
Fig. 6 is a view of the device at right angles from that shown in Fig. 5.

Referring to Figs. 1 to 3, the reference character 10 designates an axle housing and 11 the rear axle of a motor vehicle of any suitable construction. A wheel 13 is mounted for rotation at the outer end of the axle housing. It may be rotatably mounted on the outer end of the housing by means of antifriction bearings as 14, as clearly shown in Fig. 2.

A drum 15 is mounted on the wheel 13 in any suitable manner, as by means of the bolts 160, and is adapted to rotate with the wheel. The drum 15 may, if desired, be provided with the flange 16 for strengthening or reinforcing the same, and for furnishing a guide for the external brake, if it is desirable to employ one, as in the usual construction.

A plurality of brake shoes are adapted to be mounted within the drum 15 for engaging the inner periphery thereof. Preferably two shoes 17, 18 are employed for this purpose. The two shoes may be exact duplicates of each other and the parts of each may, if desired, be symmetrically arranged, as shown in Fig. 1, whereby they are interchangeable and also reversible. The shoes may be provided with the usual brake lining 19 and the ends of the shoes are provided with flanged feet 21 and 22, which are adapted to engage or fulcrum on the corresponding sleeves 23 and 24 rotatably mounted on the studs 25 and 26 respectively.

The shoes are held in retracted position by springs 27 and 28 which are adapted to engage hooks or lugs 29 and 30 symmetrically arranged on the ends of the shoes, 17, 18.

The studs 25 and 26 are secured in the brackets 31 which are fixedly mounted on the axle housing 10, as clearly shown in Fig. 3 of the drawing.

The sleeves 23 and 24 constitute supports for cams 32 and 33 which are rigidly connected to said sleeves and which are adapted to engage the feet or flanged ends 21 and 22 of the shoes 17 and 18, respectively, for expanding the same into engagement with the brake drum.

It is desirable to make provision for inequalities and imperfections in the construction of the mechanism and also to insure the uniform application of both shoes to the braking surface. In order to accomplish this function the bore of one of the sleeves as 24 is made slightly larger than the stud 26, as by making the bore elliptical with the major axis in the direction of the thrust whereby a certain amount of play is provided which will compensate for unequal wearing of the brake shoes. The sleeve is held on the stud by pins 34 which are carried by the sleeve and is adapted to engage a groove 35 in the circumference of the stud 26. Springs 340 resiliently hold the pins 34 in said groove, whereby when the brakes are released the spring-pressed pins will center the stud in said bore. The tension of the springs is adjusted by the plugs 341.

Suitable means are provided for rotating the sleeves 23 and 24 for applying the brakes. Preferably this means operates both shoes simultaneously. Any suitable mechanism may be employed for this purpose, but in order that the mechanism may be easily manipulated and to insure the powerful application of the brakes with a minimum amount of force applied thereto, a power multiplying system or mechanism is preferably employed to accomplish this function. As shown, the brake lever 36 which is adapted to be operated from the front of the machine by the link 37 in the usual manner, is rigidly secured to a shaft 38 journaled in a bracket 39 rigidly secured to the axle housing 10. The inner end of the shaft is integral with or rigidly secured to a gear wheel 40 which meshes at each side respectively with the gears 41 and 42 journaled on shafts 43 and 44 rigidly secured to brackets 45 and 46 fixed to the axle housing 10.

The sleeves 23 and 24 are provided with or have rigidly attached thereto arms 47 and 48 which terminate at their upper ends in toothed quadrants 49 and 50 which are in mesh with the gears 41 and 42, respectively.

In order that the maximum breaking effect may be produced with the minimum amount of force applied, the parts are so arranged that the shoes when used as an internal brake are rotated in the direction in which the wheel is turning, i. e., when the wheel is turning in the direction of the arrow shown in Fig. 1 the shoes will be rotated clockwise. In any event, the shoes will be so mounted that the frictional resistance between the same and the drum will tend to apply the brakes more firmly. This is an important feature of the invention because both brake shoes are operated in such a manner as to secure the maximum braking effect by rotating them both in the same direction. Where the brake shoes engage the inner periphery of the brake drum the shoes will be rotated in the same direction in which the drum is rotating, in applying the brakes during the forward movement of the vehicle. If brake shoes are employed for the external brake the shoes will, of course, be arranged to rotate in the reverse direction, in order to secure the desired result. In either case, the parts are so arranged that during the normal or forward movement of the wheels the frictional engagement of the brake shoes with the rotating drum will tend to assist in setting the brakes.

The power may be multiplied to any desired extent by varying the relative sizes of the gears 41 and 42 to that of the gear 40, or by varying the length of the arms 47 and 48.

When the wheel is turning forwardly as indicated by the arrow in Fig. 1, and the brakes are applied by pulling forwardly on the brake rod 37 by the foot lever in the usual manner, the free ends of the brake shoes 17 and 18 are rotated into frictional engagement with the brake drum. The parts are so arranged that the friction between the shoes and the rotating drum will tend to move each brake shoe more firmly into frictional engagement with the drum thereby efficiently applying the individual brake shoes with a minimum amount of force applied to the brake rod 37. When the brake linings become worn the shoes may be reversed to present a fresh lining surface to the drum, thereby materially increasing the life of the brake lining.

Figure 7:
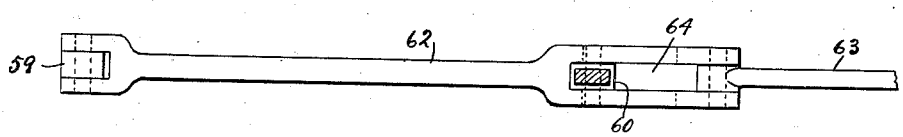
Fig. 7 is a detail view showing the link arrangement for operating the brake shoes.

In the form of the device shown in Figs. 5, 6 and 7, the drum 15 and the brake shoes 17 and 18 are substantially the same as those disclosed in Figs. 1 to 4. In these figures a modified form of brake operating mechanism is employed.

The axle housing 10 is provided with oppositely extending arms or brackets 51 and 52 in which are secured the studs 53 and 54 which are pivotally mounted therein. These studs are provided with cams 57 and 58, respectively, for engaging the corresponding flanged ends of the brake shoes 17 and 18.

It may be desirable to employ one of the shoes as a service brake and the other as an emergency brake, or one as a service brake and both as an emergency brake. By way of example, the latter construction is shown in Figs. 5, 6 and 7, and this mechanism will now be described.

The studs 53 and 54 are provided with rigid arms 59 and 60 and one of the arms as 60 may be operated by the service brake pedal or even through the link 61. The arm 59 of the other stud is adapted to be operated by the emergency brake lever through the links 62 and 63. The link 62 is provided with a slot 64 (see Fig. 7) through which the arm 60 extends. A pin 65 carried by the arm 60 loosely engages the slot 66 for holding the link 62 in operative position.

The parts are so arranged that the arm 60 rests in the rear end of the slot 64 when the brake is released. This arrangement permits the arm 60 to be moved forward to apply the service brake shoe 18 without affecting the brake shoe 17. A pull on the link 63, however, will apply both brake shoes simultaneously, the shoe 17 being operated directly by the link 62 and the other by the same link through the engagement of the rear end of the slot 64 with the arm 60.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a vehicle wheel, a brake drum on said wheel, said drum being adapted to be rotated in a given direction, a plurality of substantially rigid brake shoes for frictionally engaging the inner surface of said drum and means for rotating each of said shoes in the direction in which said drum is rotating for frictionally engaging said drum during the forward movement of said wheel.

2. In combination, a vehicle wheel, a brake drum secured to said wheel and adapted to rotate in a given direction, and provided with an inner braking surface, a plurality of brake shoes for engaging the braking surface of said drum, each brake shoe extending less than one half the circumference of the drum, and means for rotating said shoes in the direction of the rotation of said drum for bringing said shoes into frictional engagement with said drum during the forward movement of said wheel.

3. In combination, a drum, a plurality of brake shoes associated with said drum, a brake lever and intergeared mechanism comprising shafts having cams thereon for engaging said shoes for moving all of said shoes into frictional engagement with said drum when said brake lever is operated in one direction.

4. In combination, a wheel, an axle housing associated therewith, brackets secured to said housing, studs carried by said brackets, a drum carried by said wheel, a brake shoe slidably mounted on each stud and means on said studs for rotating said shoes into frictional engagement with said drum.

5. In combination, a wheel, a brake member thereon, a plurality of brake shoes, means for moving said shoes into frictional engagement with said member, said shoes being so arranged that when said means are operated the frictional resistance between the shoes and said member on the forward rotation of said wheel will tend to more firmly apply all of said braking shoes and means for equalizing the brake applying force between the shoes.

6. In combination, a wheel, a brake drum carried thereby, a pair of brake shoes for engaging the inner surface of said drum, a pair of pins associated with said drum and constituting fulcrums for said brake shoes, said shoes slidably engaging said pins, each of said pins being provided with a cam for engaging a corresponding shoe for forcing the same in frictional engagement with said drum.

7. In combination, a wheel, a brake drum thereon, a plurality of brake shoes slidably and rotatably associated with said drum, and cam members for rotating said shoes in the direction of the rotation of said drum for bringing said shoes into frictional engagement therewith during the forward movement of said wheel.

8. In combination, a rotating wheel, a brake drum secured to said wheel, a plurality of brake shoes associated with said drum, and means for rotating all of said brake shoes in the same direction and in the direction of rotation of the forwardly moving wheel for frictionally engaging said drum, said shoes being interchangeable and reversible.

9. In combination, a wheel, a brake drum secured to said wheel, a brake shoe, a fulcrum, said shoe slidably engaging said fulcrum, a cam member for moving the free end of said shoe into engagement with said drum, an arm provided with a quadrant for rotating said cam member, and means engaging said quadrant for operating the same.

10. In combination, a wheel, an axle therefor, an axle housing associated with said axle, a brake drum carried by said wheel, brake shoes fulcrumed on an extended portion of said housing, cam members for operating said shoes, arms rigidly secured to said cam members, gear quadrants on said arms, intermediate gears meshing with said quadrants, a central gear wheel meshing with said intermediate gears, and a lever for operating said central gear wheel.

11. In combination, a wheel, an axle therefor, an axle housing associated with said axle, a brake drum carried by said wheel, studs carried by said housing, a brake shoe fulcrumed on each stud, a sleeve pivoted on each stud and provided with a cam for engaging the free end of the corresponding shoe, an arm integral with each sleeve, a quadrant gear on each arm, an intermediate gear meshing with the corresponding gear, an operating gear meshing with each intermediate gear, and means for rotating said operating gear for rotating said brake shoes into frictional engagement with said drum.

12. In a brake mechanism, a brake drum adapted to rotate in a given direction, a plurality of brake shoes for engaging said drum, means for operating said shoes, said means comprising cam members, supporting means for said cam members, one of said cam members being rotatably mounted relative to said supporting means and being bodily movable relative to said shoes, whereby the pressure on said shoes will be equalized when said cam members are operated to apply the brakes, and means for substantially preventing vibration of said bodily movable cam member.

13. In a brake mechanism, a brake drum, a plurality of brake shoes for engaging said drum, a plurality of single acting cams for operating said shoes, and means associated with one of said elements for automatically equalizing the pressure among said shoes when the shoes are forced into frictional contact with said drum.

14. In combination, a rotatable wheel, a brake drum secured to said wheel, a plurality of brake shoes rotatably associated with said drum, means for rotating said shoes in the direction of the rotation of said drum for bringing said shoes into frictional engagement with said drum during forward rotation of said wheel, and means for equalizing the pressure applied to said shoes when the same are forced into frictional engagement with said drum.

15. In combination, a wheel, a brake drum thereon, a plurality of braking shoes associated therewith, a plurality of single acting cams for moving said shoes into frictional engagement with said drum and means for equalizing the pressure on the shoes when the same are forced into engagement with said drum.

16. In combination, a vehicle wheel having a drum thereon, a plurality of brake shoes within said drum, each having a fulcrum, each of said shoes being rotatable about its fulcrum and slidable thereon, cams for rotating said shoes in the direction of the rotation of said wheel during the forward movement of the vehicle to bring the same into frictional contact with said drum, whereby the friction between said drum and shoes will more firmly apply the same and will cause said shoes to slide on said fulcrums to bring the entire drum engaging faces of said shoes into frictional contact with said drum.

SIMON DEE.